US012730229B2

(12) United States Patent
Ruf et al.

(10) Patent No.: US 12,730,229 B2
(45) Date of Patent: Sep. 8, 2026

(54) NEXT GENERATION GNSS-R RECEIVER

(71) Applicants: THE REGENTS OF THE UNIVERSITY OF MICHIGAN, Ann Arbor, MI (US); OHIO STATE INNOVATION FOUNDATION, Columbus, OH (US)

(72) Inventors: Christopher Ruf, Ann Arbor, MI (US); Ryan P. Miller, Howell, MI (US); Timothy Butler, Ann Arbor, MI (US); Andrew O'Brien, Columbus, OH (US); Chi-Chih Chen, Dublin, OH (US)

(73) Assignees: THE REGENTS OF THE UNIVERSITY OF MICHIGAN, Ann Arbor, MI (US); OHIO STATE INNOVATION FOUNDATION, Columbus, OH (US)

( * ) Notice: Subject to any disclaimer, the term of this patent is extended or adjusted under 35 U.S.C. 154(b) by 609 days.

(21) Appl. No.: 18/129,226

(22) Filed: Mar. 31, 2023

(65) Prior Publication Data

US 2023/0314623 A1 Oct. 5, 2023

Related U.S. Application Data

(60) Provisional application No. 63/326,460, filed on Apr. 1, 2022.

(51) Int. Cl.
*G01S 19/37* (2010.01)
*G01S 13/00* (2006.01)
(Continued)

(52) U.S. Cl.
CPC .............. *G01S 19/37* (2013.01); *G01S 19/33* (2013.01); *G01S 19/36* (2013.01); *G01S 13/003* (2013.01)

(58) Field of Classification Search
CPC .......... G01S 19/37; G01S 19/33; G01S 19/36; G01S 13/003
See application file for complete search history.

(56) References Cited

U.S. PATENT DOCUMENTS 4,660,048 A * 4/1987 Doyle .................. H01Q 9/0428 343/700 MS
5,767,807 A * 6/1998 Pritchett .................. H01Q 3/24 343/834

(Continued)

OTHER PUBLICATIONS

C. Ruf et al., "Next Generation GNSS-R Instrument," IGARSS 2020—2020 IEEE International Geoscience and Remote Sensing Symposium, Waikoloa, HI, USA, 2020, pp. 3353-3356, doi: 10.1109/IGARSS39084.2020.9324588. (Year: 2020).*

(Continued)

*Primary Examiner* — William Kelleher
*Assistant Examiner* — Noah Yi Min Zhu
(74) *Attorney, Agent, or Firm* — Harness, Dickey & Pierce, P.L.C.

(57) ABSTRACT

A system includes a navigation antenna configured to receive first satellite signals transmitted from a first type of satellite in a first frequency band and second satellite signals transmitted from a second type of satellite in a second frequency band and generate RHCP signal responses based on the first and second satellite signals, a plurality of science antennas configured to receive the first satellite signals in the first frequency band and the second satellite signals in the second frequency band as reflected from a ground surface and generate LHCP signal responses and RHCP signal responses based on the first and second satellite signals, and a receiver module including a processing module and a plurality of receivers coupled between the navigation antenna and the plurality of science antennas and the processing module. The processing module is configured to (Continued)

generate telemetry data based on the received LHCP and RHCP signal responses.

20 Claims, 3 Drawing Sheets

(51) Int. Cl.
*G01S 19/33* (2010.01)
*G01S 19/36* (2010.01)

(56) References Cited

U.S. PATENT DOCUMENTS

| | | | | |
|---|---|---|---|---|
| 7,471,241 | B1 * | 12/2008 | Yang | G01S 5/021 342/357.73 |
| 8,988,296 | B2 * | 3/2015 | Koskiniemi | H01Q 9/42 343/702 |
| 9,711,866 | B1 * | 7/2017 | Doane | H01Q 19/13 |
| 11,784,413 | B2 * | 10/2023 | Bray | H01Q 13/106 343/702 |
| 11,914,050 | B2 * | 2/2024 | Iyengar | H01Q 9/42 |
| 2002/0169578 | A1 * | 11/2002 | Yang | G01S 19/30 702/152 |
| 2012/0186073 | A1 * | 7/2012 | Feller | H01Q 1/38 29/600 |
| 2013/0169474 | A1 * | 7/2013 | White | G01S 19/28 342/357.23 |
| 2014/0111376 | A1 * | 4/2014 | Bench | H01Q 9/44 343/893 |
| 2014/0210678 | A1 * | 7/2014 | Chen | H01Q 13/10 343/725 |
| 2017/0358863 | A1 * | 12/2017 | Stepanenko | H01Q 15/16 |
| 2019/0089069 | A1 * | 3/2019 | Niroo | H01Q 13/10 |
| 2020/0132854 | A1 * | 4/2020 | Kubina | H01Q 25/001 |
| 2020/0284918 | A1 * | 9/2020 | Capet | G01S 19/22 |
| 2020/0381842 | A1 * | 12/2020 | Milroy | H01Q 1/1228 |
| 2021/0223387 | A1 * | 7/2021 | Wang | G01S 13/003 |
| 2021/0367341 | A1 * | 11/2021 | Hasan Abadi | H01Q 21/065 |
| 2021/0408660 | A1 * | 12/2021 | Verwoerd | H01Q 1/2216 |
| 2022/0119091 | A1 * | 4/2022 | Graf | H01Q 1/286 |
| 2022/0149522 | A1 * | 5/2022 | Eom | H01Q 3/26 |
| 2022/0302603 | A1 * | 9/2022 | Chieh | H01Q 21/0075 |
| 2023/0057434 | A1 * | 2/2023 | Lim | H01Q 21/065 |
| 2023/0137969 | A1 * | 5/2023 | Kim | G01S 19/29 342/357.59 |
| 2023/0145189 | A1 * | 5/2023 | Elian | F16B 5/0642 343/872 |

OTHER PUBLICATIONS

Gleason et al., “A Real-Time On-Orbit Signal Tracking Algorithm for GNSS Surface Observations,” Remote Sens. 2019, 11, 1858. https://doi.org/10.3390/rs11161858 (Year: 2019).*

G. Jurkovic et al., “Remote firmware update for constrained embedded systems,” 2014 37th International Convention on Information and Communication Technology, Electronics and Microelectronics (MIPRO), Opatija, Croatia, 2014, pp. 1019-1023, doi: 10.1109/MIPRO.2014.6859718. (Year: 2014).*

* cited by examiner

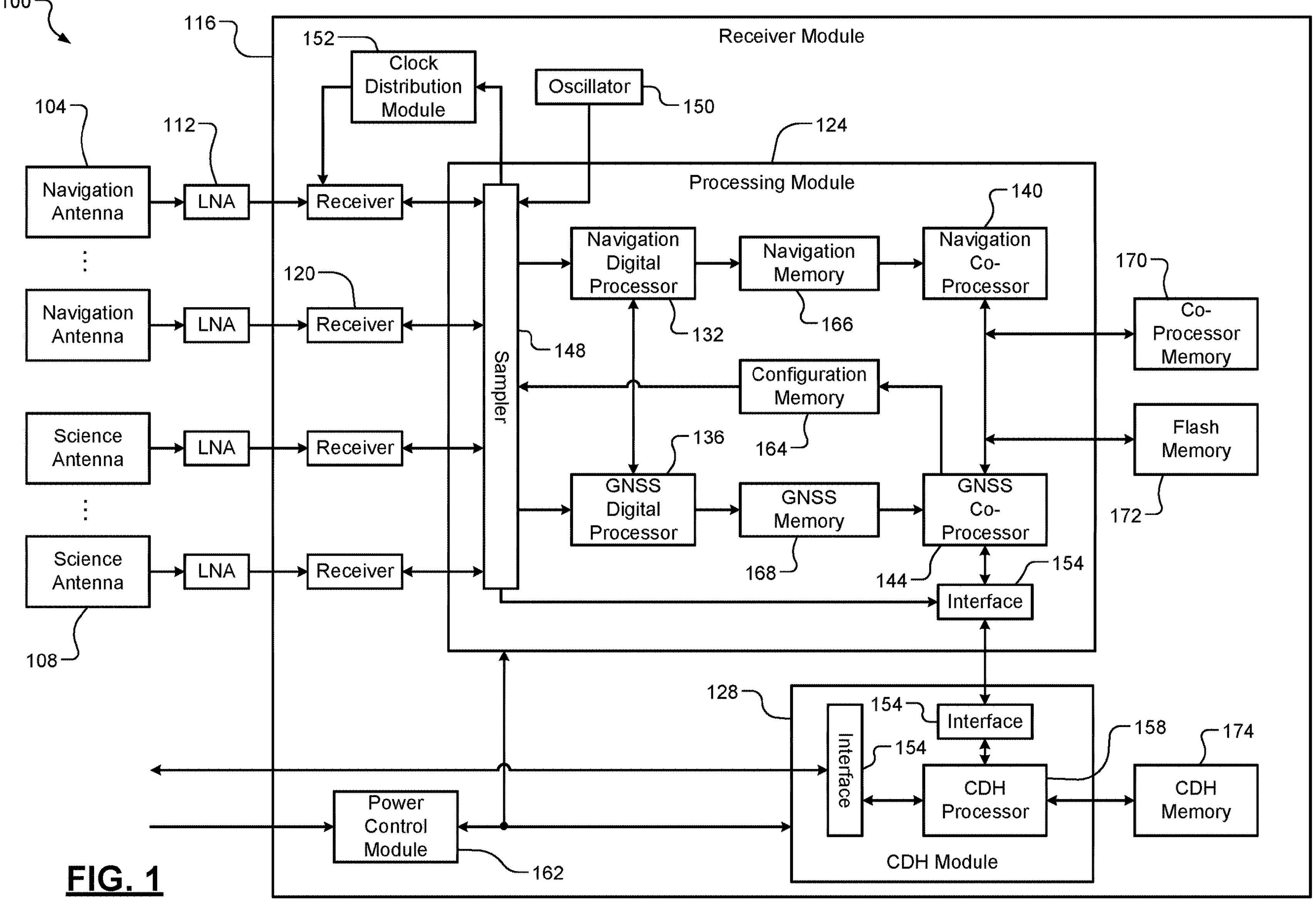
100
116
Receiver Module
152
Clock Distribution Module
Oscillator
150
104
Navigation Antenna
112
LNA
Receiver
124
Processing Module
140
Navigation Digital Processor
Navigation Memory
Navigation Co-Processor
Navigation Antenna
120
LNA
Receiver
Sampler
148
132
166
170
Co-Processor Memory
Configuration Memory
Science Antenna
LNA
Receiver
136
164
Flash Memory
GNSS Digital Processor
GNSS Memory
GNSS Co-Processor
172
Science Antenna
LNA
Receiver
168
144
154
Interface
108
128
154
Interface
158
174
154
Interface
CDH Processor
CDH Memory
Power Control Module
CDH Module
162
FIG. 1

402
400
LHCP Input
RHCP Input
Device Mounting Panel
Antenna Module
412
404
416
420-2
420-1
408
410

408
428
424
430
402
422
426

402
442
444
440
410

442
440
448

NEXT GENERATION GNSS-R RECEIVER

CROSS-REFERENCE TO RELATED APPLICATION

This application claims the benefit of U.S. Provisional Application No. 63/326,460, filed on Apr. 1, 2022. The entire disclosure of the above application is incorporated herein by reference.

GOVERNMENT SUPPORT CLAUSE

This invention was made with government support under AWD004252 and NNH16ZDA001 N-IIP awarded by the National Aeronautics and Space Administration. The government has certain rights to the invention.

FIELD

The present disclosure relates to satellite receivers, and more particularly to satellite receivers configured to process reflected signals transmitted by navigation satellites and received by both navigation and science antennas.

BACKGROUND

Various types of satellite navigation systems transmit signals used for geolocation. A Global Navigation Satellite System (GNSS) is a satellite navigation system with global coverage. Example GNSSs include, but are not limited to, global positioning system (GPS) and Galileo.

Satellite receivers may have one or more antennas configured to receive the transmitted satellite signals. In some examples, a satellite receiver may be implemented as a bistatic radar receiver. A bistatic radar receiver includes one or more antennas (e.g., a science antenna) configured to measure reflected GNSS signals transmitted by GNSS satellites reflected from the ground (i.e., GNSS reflectometry (GNSS-R) radar measurement). Other types of receivers may include antennas (e.g., navigation antennas) configured to directly receive and measure signals.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system configured to receive satellite signals includes a navigation antenna configured to receive first satellite signals transmitted from a first type of satellite in a first frequency band and second satellite signals transmitted from the first or a second type of satellite in a second frequency band and generate right hand circular polarization (RHCP) signals based on the first and second satellite signals, a plurality of science antennas configured to receive the first satellite signals in the first frequency band and the second satellite signals in the second frequency band as reflected from a ground surface and generate both LHCP signal responses and RHCP signal responses based on the first and second satellite signals, and a receiver module including a processing module and a plurality of receivers coupled between the navigation antenna and the plurality of science antennas and the processing module. The processing module is configured to receive the RHCP signal responses from the navigation antenna and the plurality of science antennas via the plurality of receivers and generate telemetry data based on the received LHCP and RHCP signal responses.

In other features, the processing module includes a system on a chip (SOC) comprising first and second processor cores and field programmable gate array (FPGA) logic configured to process the LHCP signal responses and the RHCP signal responses received from the navigation antenna and the plurality of science antennas. The system further includes low noise amplifiers arranged between the navigation antenna and the plurality of science antennas and the plurality of receivers. The system includes six science antennas. The first satellite signals correspond to global positioning system (GPS) satellite signals and the second satellite signals correspond to Galileo satellite signals.

In other features, the first frequency band is an L1/E1 frequency band and the second frequency band is an L5/E5 frequency band. The receiver module includes a command and data handling (CHD) module configured to receive the telemetry data from the processing module and transmit the telemetry data from the receiver module. Each of the plurality of receivers is configured to operate in at least two channels corresponding respectively to the first frequency band and the second frequency band. A sampler is configured to sample the LHCP and RHCP signal responses transmitted from the navigation antenna and the plurality of science antennas. The processing module is configured to perform channel correlation on the LHCP and RHCP signal responses.

In other features, the system further includes an antenna module that includes the plurality of science antennas. Each of the plurality of science antennas includes a substrate supporting a printed circuit board printed circuit board layer that includes first and second output ports and first and second feeding pins extending from the printed circuit board. The first and second feeding pins configured to carry LHCP and RHCP signal responses output from the first and second output ports, respectively. Each of the plurality of science antennas further includes a parasitic pin extending from the printed circuit board.

In other features, the antenna module includes a mounting board and a feeding network arranged on or embedded within the mounting board. The first and second feeding pins of each of the plurality of science antennas is coupled to the feeding network. The feeding network includes an LHCP path coupled to the first feeding pins and an RHCP path coupled to the second pins. The system further includes a spacer layer arranged adjacent to the mounting board. The spacer layer includes channels defined around traces of the feeding network. The spacer layer is honeycombed.

A system configured to receive satellite signals includes a navigation antenna configured to receive first satellite signals transmitted from a first type of satellite in a first frequency band and second satellite signals transmitted from a second type of satellite in a second frequency band and generate right hand circular polarization (RHCP) signal responses based on the first and second satellite signals, a plurality of science antennas configured to receive the first satellite signals in the first frequency band and the second satellite signals in the second frequency band as reflected from a ground surface and generate LHCP signal responses and RHCP signal responses based on the first and second satellite signals, a receiver module including a processing module and a plurality of receivers coupled between the navigation antenna and the plurality of science antennas and the processing module, each of the plurality of receivers is configured to operate in at least two channels corresponding respectively to the first frequency band and the second frequency band, and low noise amplifiers arranged between the navigation antenna and the plurality of science antennas and the plurality of receivers. The processing module is configured to receive the LHCP signal responses and the RHCP signal responses from the navigation antenna and the plurality of science antennas via the plurality of receivers and generate telemetry data based on the received LHCP and RHCP signal responses, and the processing module includes a system on a chip (SOC) comprising first and second processor cores and field programmable gate array (FPGA) logic configured to process the LHCP signal responses and the RHCP signal responses received from the navigation antenna and the plurality of science antennas.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an example satellite receiver according to the present disclosure;

In the drawings, reference numbers may be reused to identify similar and/or identical elements.

DETAILED DESCRIPTION

Figures 2, 3:
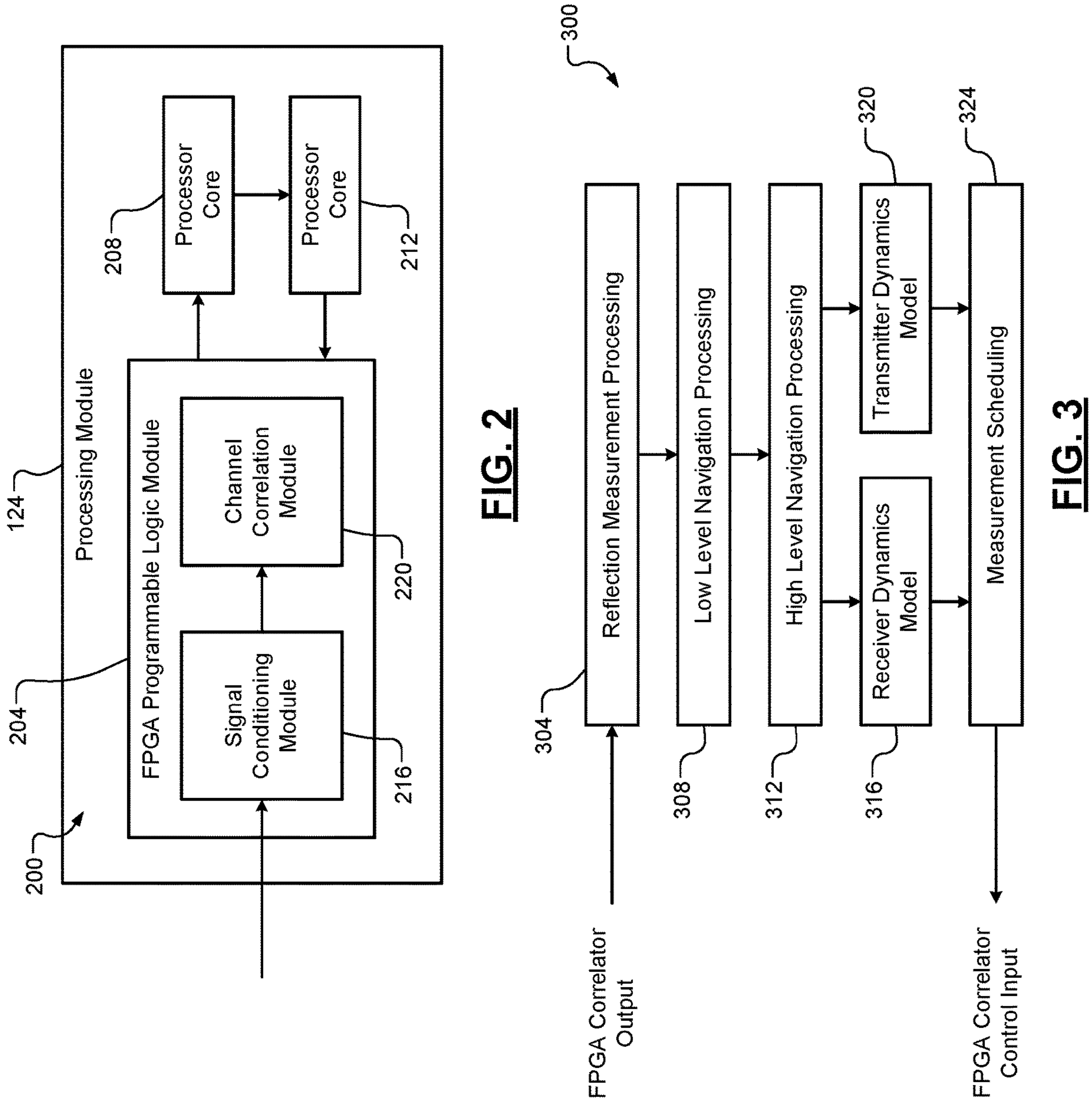
FIG. 2 is a functional block diagram of an example processing module of a satellite receiver according to the present disclosure.
FIG. 3 illustrates an example flow diagram of the processing module of FIG. 2 according to the present disclosure.

Satellite receivers (e.g., GNSS-R receivers) may be limited by the number of satellite signals that can be tracked and measured at the same time, and/or may be limited by the type of satellite signals that can be processed. GNSS-R receiver systems and methods according to the present disclosure are configured to track and measure a greater number of satellite signals simultaneous. In one example, a GNSS-R receiver has a modular and reconfigurable design that allows measurement and processing of signals transmitted from different types of GNSS satellites (e.g., GPS and Galileo), as well as different types of signals transmitted from each type of GNSS satellite (e.g., signals in multiple frequency bands, signals with multiple modulation sidebands, etc.).

Referring now to FIG. 1, an example satellite receiver 100 (e.g., a GNSS-R receiver) according to the present disclosure is shown. The satellite receiver 100 includes a plurality of navigation antennas 104 and a plurality of science antennas 108 configured to receive transmitted satellite signals from various GNSS satellites. In one example, the satellite receiver 100 includes one or more antenna elements in the navigation antennas 104 and four or more (e.g., six) antenna elements in the science antennas 108.

The science antennas 108 are configured to receive GNSS signals reflected from the ground (i.e., the surface of the earth). The science antennas 108 are implemented as dual-band, dual-polarization antennas configured to receive signals in a GPS L1/Galileo E1 frequency band and a GPS L5/Galileo E5 frequency band with either right-hand or left-hand circular polarization. In one example, the science antennas 108 are provided in a configuration with six antenna elements and provide an L1 gain of at least 14 dBic and an L5 gain of at least 12 dBic, an across track field of view of approximately 60 (e.g., 55-65) degrees, and an along track field of view of approximately 30 (e.g., 25-35) degrees.

Conversely, the navigation antennas 104 are configured to directly receive GNSS signals (e.g., GPS L1/Galileo E1 and GPS L5/Galileo E5 signals) to provide satellite position information and reference signals for signal processing.

Respective low noise amplifiers (LNAs) 112 receive signals output from the antennas 104, 108 and provide amplified signals to a receiver module 116. For example, the LNAs 112 provide a gain of 30 dB to the outputs of the antennas 104, 108. The LNAs 112 are arranged adjacent to the antennas 104, 108 to minimize the effects of cable loss between the antennas 104, 108 and the receiver 100. The LNAs 112 further provide band pass filtering at the L1/E1 and L5/E5 frequency bands to limit noise. In some examples, the LNAs 112 are configured to provide warm load and cold load input selections to facilitate in-flight calibration.

The receiver module 116 is configured as a signal processor comprising receivers 120 (e.g., tuner modules) arranged between the LNAs 112 and a digital processing module 124. For example, the processing module 124 implements a digital signal processing (DSP) field programmable gate array (FPGA). In some examples, a command and data handling (CDH) module 128 implements a second FPGA configured to perform CHD functions, such as processing commands, transmitting telemetry data, etc.

The receiver module 116 may include the same number of receivers 120 as antennas 104, 108 (i.e., one receiver for each antenna). Each of the receivers 120 has two channels with respective signal bands (e.g., a narrow band channel for L1/E1 signals and a wide band channel for L5/E5 signals). The receivers 120 provide a mixing function for each of the two signal bands. Accordingly, the received satellite (GPS/Galileo) signals can be shifted down to a baseband intermediate frequency (IF). The signals are then digitized to provide narrow band and wide band sample streams to the processing module 124 for each antenna input.

The receivers 120 may be configured as plug-in modules. For example, the processing module 124 may correspond to a printed circuit board or other device and the receivers 120 may be selectively inserted in and removed from respective slots or sockets on the printed circuit board. In this manner, the number of receivers 120 installed may be varied based on the desired number of input channels and corresponding antennas 104, 108.

The processing module 124 may be configured as a system on a chip (SOC) including processors and processor cores (e.g., a dual core processor and associated firmware), FPGA programmable logic, and associated memory. For example, a navigation digital processor 132, a GNSS digital processor 136, a navigation co-processor 140, and a GNSS co-processor 144 are configured to receive digitized inputs (e.g., from the receivers 120) via respective channels and a sampler 148 and generate packets based on the data contained in the signals. As one example, the sampler 148 is configured to sample signals from the receivers 120 in accordance with a clock signal generated based on an oscillator 150 and provided to a clock distribution module 152.

As one example, the processors 132, 136, 140, and 144 and the sampler 140 form a processing loop in which data packets pass through a channel selection multiplexer, a Doppler mixer, and a quadrature encoder and are then provided to a programmable array of correlators (e.g., a correlator bank) implemented by the processors 132, 136. The correlator bank allows GNSS satellite signal detection and data extraction as well as the generation of Delay Doppler Maps. The output from the correlators is provided to the processors 140, 144.

The processors 140, 144 are configured to program the correlator bank to detect and measure signals of interest in the inputs received from the sampler 148 and read the corresponding data at a programmable rate. The processors 140, 144 then use the correlation results to extract GNSS navigation information from navigation channels and GNSS science data from science channels. The processors 140, 144 collect and packetize the processed data and transmit the data packets to the CDH module 128 for transmission from the receiver module 116 (e.g., via respective communication interfaces 154).

The CDH module 128 controls various operations of the receiver module 116 (e.g., using a CDH processor 158, which may be implemented by a FPGA). For example, the CDH module 128 communicates with an external device or entity (e.g., a spacecraft or terrestrial vehicle or building comprising the receiver module 116) to receive commands and to transmit telemetry data. The CDH module 128 is configured to control power distribution to components of the receiver module 116 (e.g., using a power control module 162 that receives power from a power source external to the receiver module 116), control firmware and software updates, perform instrument housekeeping functions, and monitor system parameters to ensure proper operation of the receiver module 116.

The CDH module 128 is further configured to provide configuration information and uplinked commands to the processing module 124. The CDH module 128 receives the packetized data output from the processing module 124 and formats the packetized date into telemetry packets for transmission (e.g., to a spacecraft, a ground station, etc.).

The receiver module 116 may include various memory or storage modules configured as buffers, volatile memory, non-volatile memory, storage devices, etc. For example, the processing module 124 includes configuration memory 164 that stores configuration data provided from the processor 144 to the sampler 148. Navigation memory 166 is configured as a buffer between the processors 132 and 136 and GNSS memory 168 is configured as a buffer between the processors 136 and 144. One or more memory modules (e.g., co-processor memory 170, flash memory 172) may be located external to the processing module 124. Similarly, CDH memory 174 may be located external to the CDH module 128.

FIG. 2 shows a processing loop 200 implemented by the processing module 124. For example only, an FPGA programmable logic module ("logic module") 204 corresponds to functions performed by the processors 132 and 136 and processor cores 208, 212 correspond to dual-core processor functions performed by the processors 140 and 144, respectively. The logic module 204 implements high-rate, sample-level signal processing algorithms of the receiver module 116, including digital signal pre-conditioning (e.g., using a signal conditioning module 216) and channel correlation (e.g., using a bank of correlator channels represented by a channel correlation module 220).

Logic module 204 provides processed correlator data (e.g., at a data rate of once per millisecond) to the processor cores 208, 212. The processor cores 208, 212 perform instrumentation logic of the processing module 124 (e.g., as executed software). For example, the processor cores 208, 212 perform high-precision math operations and provide flexible implementation and update capabilities. Accordingly, the processor module 124 is configured to perform, on a single SOC, advanced measurement and processing with rapid and efficient update capabilities.

Correlator channels within the logic module 204 are configured for flexible assignment to selected front-end input signals. In other words, any of the correlator channels can be selectively assigned to different signals received from any of the antennas 104, 108. The correlator channels may be assigned during manufacture and/or dynamically during operation.

As one example, the processor core 208 is configured to execute signal processing software to control communication with the logic module 204, respond to software interrupts generated by the logic module 204, etc. Outputs of the channel correlation module 220 are provided to the processor core 208, which accumulates the correlator data and organizes the correlator data in memory. The processor core 208 is further configured to moderate logic module registers for access to status and metadata information and for controlling FPGA settings. For example, the processor core 208 has shared register access with the FPGA of the logic module 204.

Conversely, the processor core 212 is configured to execute signal processing software to process the correlator data, generate GNSS navigation solutions or results, determine the difference in depth modulation (DDM), calculate specular points, etc. The processor core 212 operates in parallel with the operations of the processor core 208. For example only, the processor core 212 operates on one second of batch raw data per execution event (i.e., as opposed to continuous operation in real-time). In this manner, the processor core 212 can reprocess the same one second of data multiple times and/or using different processing techniques to obtain a navigation result. The processor core 212 is further configured to predict where each correlator channel should be targeted in the next one second period and provides instructions to the channel correlator module 220 accordingly.

FIG. 3 shows an example software flow diagram 300 corresponding to functions performed by the processor cores 208, 212 (e.g., the signal processing software executed by the processor core 208 and/or 212). At 304, reflection measurement processing is performed to coherently and incoherently integrate correlator data (e.g., 1-kHz complex correlator data) to determine DDMs at a user-configurable rate, bit-compress pixel data, and generate DDM output packets. At 308, low-level navigation processing is performed to process correlator data (e.g., raw 1-kHz correlator data). For example, for each one second batch of data corresponding to a direct path signal channel, the data is integrated once to generate coarse delay and Doppler estimates. The same batch of data is processed a second time to replace coarse tracking information with fine tracking information estimates, including precise delay, Doppler, phase, and data bits. The software-based batch processing replaces delay lock loop (DLL), frequency lock loop (FLL), etc. processing used in conventional hardware-based GPS receivers.

Raw delay and Doppler and phase information from all tracked GNSS signals are processed using high-level navigation processing at 312 to determine pseudoranges, process navigation data bits and orbital information, and generate a position-velocity-and-time (PVT) solution. The PVT solution of the receiver module 116 (which alternatively may be provided from an external aiding source), is provided to an internal receiver dynamics model 316 configured to extrapolate (i.e., predict) an upcoming receiver position (e.g., a predicted receiver position several seconds from the present time). Similarly, a transmitter dynamics model 320 is configured to use ephemeris information to extrapolate or predict future GNSS satellite geometry information. At 324, measurement scheduling is performed using the predicted receiver position and predicted satellite geometry information to predict specular points, assign a figure-of-merit to potential measurements, select measurements to perform, and formulate an open-loop correlator command to be executed during a proceeding second by the FPGA of the logic module 204. Upon execution of the processes 304-324, relevant telemetry data (e.g., science data packets) is assembled and is available to the CDH module 128 for output.

As described above, the navigation antennas 104 and the science antennas are each configured to receive signals in both L1/E1 and L5/E5 bands and generate, as responses to the signals, both LHCP and RHCP signal responses, and the receiver module 116 is configured to process a plurality of these signals (e.g., 20 signals) on a single chip. In other words, the processing module 124 is implemented as a single chip (e.g., an SOC) configured to perform both science and navigation processing functions. In this manner, processing time and overhead can be reduced by performing science and navigation signal processing in parallel and eliminating communication between separate science and navigation processing modules (e.g., separate chips). Further, since the science and navigation processing share the same processing module 124, other components (e.g., memory, the sampler 148, oscillator and clock functions, etc.), overall cost and a device footprint can be reduced.

Referring now to FIGS. 4A-4D, an example antenna array or module 400 according to the disclosure is described in more detail. For example, the antenna module 400 comprises a mounting board 402 (e.g., a laminate board) with an embedded feeding network 404 and a plurality of (e.g., six) antenna elements 408. The antenna module 400 is mounted on a device mounting panel 410 (e.g., a grounded panel of a satellite). The antenna elements 408 correspond to science antenna elements configured to operate in both the L1/E1 band (e.g., centered at 1575.42 GHz, at a bandwidth of 20 MHz) and the L5/E5 band (e.g., centered at 1176.45 GHz, at a bandwidth of 50 MHz) and in accordance with both LHCP and RHCP. In this example, the antenna elements 408 correspond to science antenna elements. In other examples, an antenna module including one or more navigation antennas may be configured in a similar manner.

The feeding network 404 is configured to provide LHCP signal responses and RHCP signal responses (via respective inputs) from each of the antenna elements 408. For example, the feeding network 404 includes an LHCP path 412 connected to each of the antenna elements 408 and an RHCP path 416 connected to each of the antenna elements 408.

In one example, the feeding network 404 is comprised of miscrostrip (MS) traces. As shown, none of the traces of the feeding network 404 cross any other traces. Each of the antenna elements 408 includes first and second output ports 420-1 and 420-2 (collectively, output ports 420) for the LHCP and RHCP signal responses, respectively, which are separated by a phase difference (e.g., a 90 degree phase difference). Signals received from each of the first output ports 420-1 are in-phase combined together. Similarly, signals from each of the second output ports 420-2 are in-phase combined together. In other words, each of the antenna elements 408 is excited in-phase with the other antenna elements 408 to generate both LHCP and RHCP signal responses.

Figures 4A, 4B, 4C, 4D:
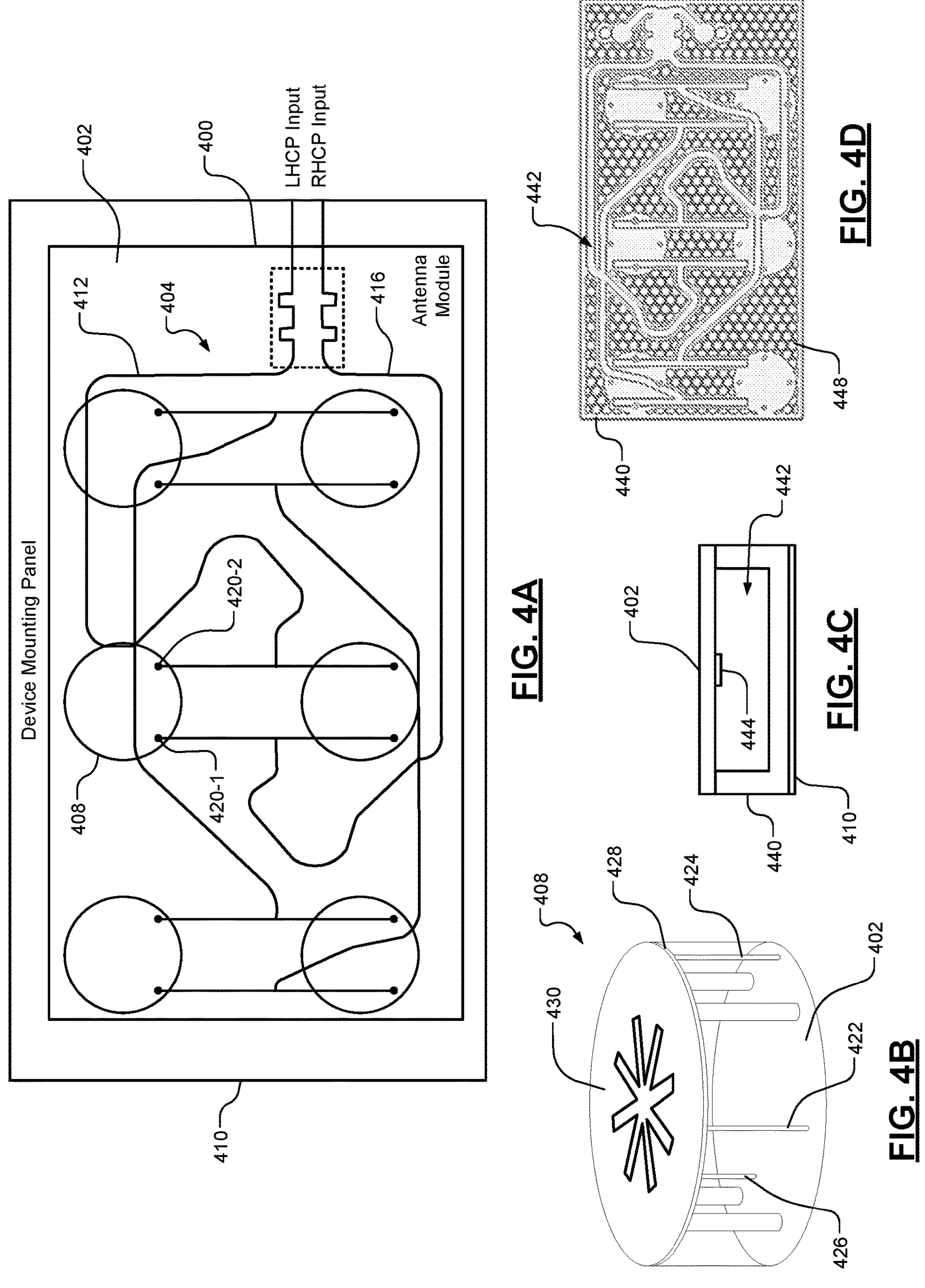
FIG. 4A is an example antenna array according to the present disclosure.
FIG. 4B is an example antenna element according to the present disclosure.
FIGS. 4C and 4D illustrate an example spacer layer of an antenna array according to the present disclosure.

FIG. 4B shows an example of the antenna element 408. As shown, the antenna element 408 is implemented as a dual band slotted patch antenna configured to provide out-of-phase signals to respective orthogonal feeding pins (e.g., conductive wire) 422 and 424. The antenna element 408 may include an additional conducting parasitic pin 426 configured to provide balance between the feeding pins 422 and 424 and reduce cross-polarization.

The antenna element 408 is cylindrical or puck-shaped and includes a lower substrate (e.g., a dielectric substrate) 428 and a printed circuit board (PCB) layer 430 (e.g., with a copper antenna plate) mounted on the lower substrate 428. The feeding pins 422 and 424 and parasitic pin 426 extend from a ground plane (e.g., the device mounting panel 410), through the lower substrate 428, and couple to the PCB layer 430.

The antenna module 400 is configured to fit on (i.e., within a footprint or outer perimeter of) the device mounting panel 410. As shown in FIGS. 4C and 4D, the mounting board 402 comprising the embedded feeding network 404 is separated from the device mounting panel 410 using a spacer layer (e.g., a dielectric spacer layer) 440 to electrically isolate the feeding network 404 from the device mounting panel 410. For example, the spacer layer 440 defines grooves or channels 442 around traces 444 of the feeding network 404 to reduce the overall weight of the spacer layer 440. The spacer layer 440 may have a honeycombed configuration as shown in FIG. 4D. In other words, the body of the spacer layer 440 includes holes or voids to further reduce the weight of the spacer layer 440.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within the method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or acknowledgement receipts of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system configured to receive satellite signals, the system comprising:

a navigation antenna configured to (i) receive first satellite signals transmitted from a first type of satellite in a first frequency band and second satellite signals transmitted from the first type or a second type of satellite in a second frequency band, (ii) generate left hand circular polarization (LHCP) signal responses and right hand circular polarization (RHCP) signal responses based on the first and second satellite signals;

a plurality of science antennas configured to (i) receive the first satellite signals in the first frequency band and the second satellite signals in the second frequency band as reflected from a ground surface and (ii) generate LHCP signal responses and RHCP signal responses based on the first and second satellite signals; and a receiver module including
a processing module, and
a plurality of receivers coupled between (i) the navigation antenna and the plurality of science antennas and (ii) the processing module,
wherein the processing module is configured to receive the LHCP signal responses and the RHCP signal responses from the navigation antenna and the plurality of science antennas via the plurality of receivers and generate telemetry data based on the received LHCP and RHCP signal responses,
wherein the processing module includes a logic module configured to process the LHCP signal responses and the RHCP signal responses to provide digital signal pre-conditioning and channel correlation.

2. The system of claim 1, wherein:
the processing module includes a system on a chip (SOC) comprising first and second processor cores and field programmable gate array (FPGA) logic configured to process the LHCP signal responses and the RHCP signal responses received from the navigation antenna and the plurality of science antennas,
the logic module provides processed correlated data to the first and second processor cores.

3. The system of claim 2, wherein:
the receiver module includes an oscillator; and
the processing module includes a sampler configured to sample the LHCP and RHCP signal responses transmitted from the navigation antenna and the plurality of science antennas,
wherein the sampler is configured to generate data packets from sampling the LHCP and RHCP signal responses in accordance with a clock signal generated with the oscillator,
wherein the processing module is configured pass the data packets through a processing loop having a channel selection multiplexer, a Doppler mixer, and a quadrature encoder.

4. The system of claim 3, wherein the receiver module includes a command and data handling (CDH) module configured to receive the telemetry data from the processing module and transmit the telemetry data from the receiver module, wherein the CDH module is configured to:
control power distribution to the receiver module with a power control module that receives power from a power source external to the receiver module;
control firmware and software updates, perform instrument housekeeping functions, and monitor system parameters for the receiver module; and
provide configuration information and uplinked commands to the processing module.

5. The system of claim 2, wherein the first and second processor cores are configured to process the correlated data according to a reflection measurement process, a low-level navigation process, and a high-level navigation process.

6. The system according to claim 5, wherein the first and second processor cores are configured to implement an internal receiver dynamics model and a transmitter dynamics model based on processing the correlated data according to the reflection measurement process, the low-level navigation process, and the high-level navigation process, wherein the internal receiver dynamics model is configured to predict an upcoming receiver position and the transmitter dynamics model is configured to predict satellite geometry information.

7. The system according to claim 6, wherein the first and second processor cores are configured to perform measurement scheduling based on the receiver position and the satellite geometry information to predict specular points, assign a figure-of-merit to potential measurements, select measurements to perform, and formulate an open-loop correlator command.

8. The system of claim 1, further comprising low noise amplifiers arranged between (i) the navigation antenna and the plurality of science antennas and (ii) the plurality of receivers.

9. The system of claim 1, wherein the first satellite signals correspond to global positioning system (GPS) satellite signals and the second satellite signals correspond to Galileo satellite signals.

10. The system of claim 1, wherein the first frequency band is an L1/E1 frequency band and the second frequency band is an L5/E5 frequency band.

11. The system of claim 1, wherein each of the plurality of receivers is configured to operate in at least two channels corresponding respectively to the first frequency band and the second frequency band.

12. The system of claim 1, further comprising an antenna module that includes the plurality of science antennas.

13. The system of claim 12, wherein each of the plurality of science antennas includes:
a substrate supporting a printed circuit board layer that includes first and second output ports; and
first and second feeding pins extending from the printed circuit board layer, the first and second feeding pins configured to carry LHCP and RHCP signal responses output from the first and second output ports, respectively.

14. The system of claim 13, wherein each of the plurality of science antennas further includes a parasitic pin extending from the printed circuit board layer.

15. The system of claim 13, wherein the antenna module comprises:
a mounting board; and
a feeding network comprised of microstrip traces arranged on or embedded within the mounting board,
wherein the first and second feeding pins of each of the plurality of science antennas are coupled to the feeding network and extend from a device mounting panel through the substrate to the printed circuit board layer.

16. The system of claim 15, wherein the feeding network includes an LHCP path coupled to the first feeding pins and an RHCP path coupled to the second feeding pins.

17. The system of claim 15, further comprising a spacer layer arranged between the mounting board and the device mounting panel to electrically isolate the feeding network from a ground plane of the device mounting panel.

18. The system of claim 17, wherein the spacer layer includes channels defined around traces of the feeding network.

19. The system of claim 17, wherein the spacer layer is honeycombed.

20. A system configured to receive satellite signals, the system comprising:
a navigation antenna configured to (i) receive first satellite signals transmitted from a first type of satellite in a first frequency band and second satellite signals transmitted from the first type or a second type of satellite in a second frequency band and (ii) generate left hand circular polarization (LHCP) signal responses and right hand circular polarization (RHCP) signal responses based on the first and second satellite signals;
a plurality of science antennas configured to (i) receive the first satellite signals in the first frequency band and the second satellite signals in the second frequency band as reflected from a ground surface and (ii) generate LHCP signal responses and RHCP signal responses based on the first and second satellite signals;

a receiver module including a processing module, and a plurality of receivers coupled between (i) the navigation antenna and the plurality of science antennas and (ii) the processing module, wherein each of the plurality of receivers is configured to operate in at least two channels corresponding respectively to the first frequency band and the second frequency band; and low noise amplifiers arranged between (i) the navigation antenna and the plurality of science antennas and (ii) the plurality of receivers, wherein the processing module is configured to receive the LHCP signal responses and the RHCP signal responses from the navigation antenna and the plurality of science antennas via the plurality of receivers and generate telemetry data based on the received LHCP and RHCP signal responses, wherein the processing module includes a system on a chip (SOC) comprising first and second processor cores and field programmable gate array (FPGA) logic configured to process the LHCP signal responses and the RHCP signal responses received from the navigation antenna and the plurality of science antennas, wherein the processing module includes a logic module configured to process the LHCP signal responses and the RHCP signal responses to provide channel correlation, wherein the first and second processor cores are configured to process correlated data from the logic module according to a reflection measurement process, a low-level navigation process, and a high-level navigation process, wherein the first and second processor cores are configured to implement an internal receiver dynamics model and a transmitter dynamics model based on processing the correlated data according to the reflection measurement process, the low-level navigation process, and the high-level navigation process, wherein the internal receiver dynamics model is configured to predict an upcoming receiver position and the transmitter dynamics model is configured to predict satellite geometry information, and wherein the first and second processor cores are configured to perform measurement scheduling based on the upcoming receiver position and the satellite geometry information to predict specular points, assign a figure-of-merit to potential measurements, select measurements to perform, and formulate an open-loop correlator command.

* * * * *